United States Patent [19]

Clapham

[11] 3,927,620
[45] Dec. 23, 1975

[54] MAGNETIC PROPULSION SYSTEM

[76] Inventor: Thomas J. Clapham, 2823 18th Ave. N., Minneapolis, Minn. 55411

[22] Filed: Dec. 3, 1973

[21] Appl. No.: 421,393

[52] U.S. Cl..... 104/148 LM; 46/238; 104/148 MS; 273/86 B
[51] Int. Cl.² .......................................... B61B 13/08
[58] Field of Search. 104/148 MS, 148 LM, 148 SS; 46/236, 238, 239, 240; 273/86 B

[56] References Cited
UNITED STATES PATENTS

| | | | |
|---|---|---|---|
| 3,158,765 | 11/1964 | Polgreen | 104/148 MS |
| 3,407,749 | 10/1968 | Frig | 104/148 LM |
| 3,815,511 | 6/1974 | Dukowicz | 104/148 LM |

*Primary Examiner*—M. Henson Wood, Jr.
*Assistant Examiner*—Reinhard J. Eisenzopf
*Attorney, Agent, or Firm*—Williamson, Bains & Moore

[57] ABSTRACT

A magnetic propulsion system includes a roadway having a generally planar upper surface and having a plurality of field-producing thrust and levitation elements adjacent the upper surface thereof. The thrust and levitation elements are energized by signal-receiving means associated with the roadway which receive high-frequency signals from signal-producing means on a vehicle. The vehicle has field-producing levitation and thrust elements and the magnetic fields produced by the levitation and thrust elements on the vehicle interact with the magnetic fields produced by the thrust and levitation elements on the roadway to permit controlled propulsion of the vehicle along the roadway.

8 Claims, 15 Drawing Figures

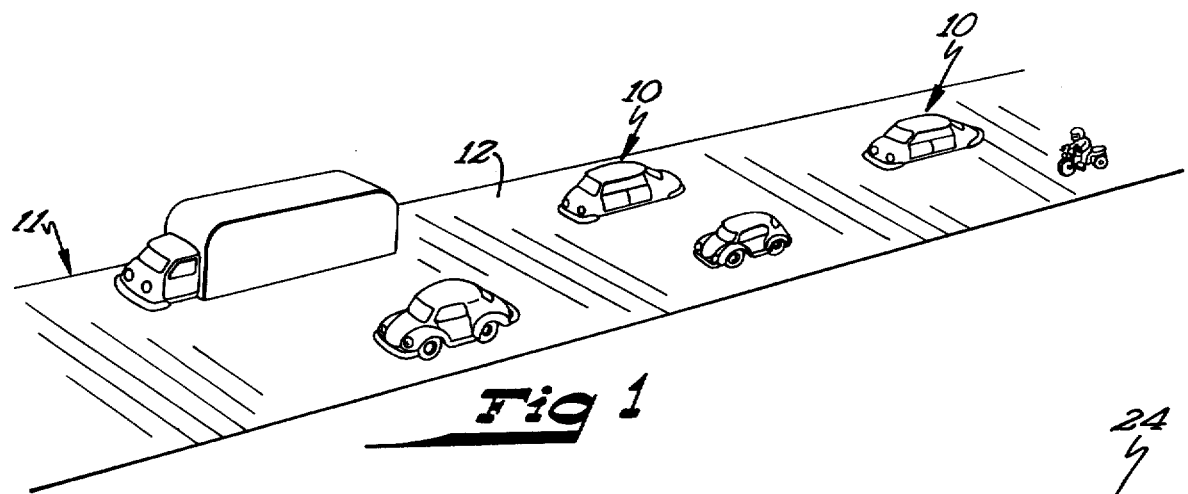
Fig 1
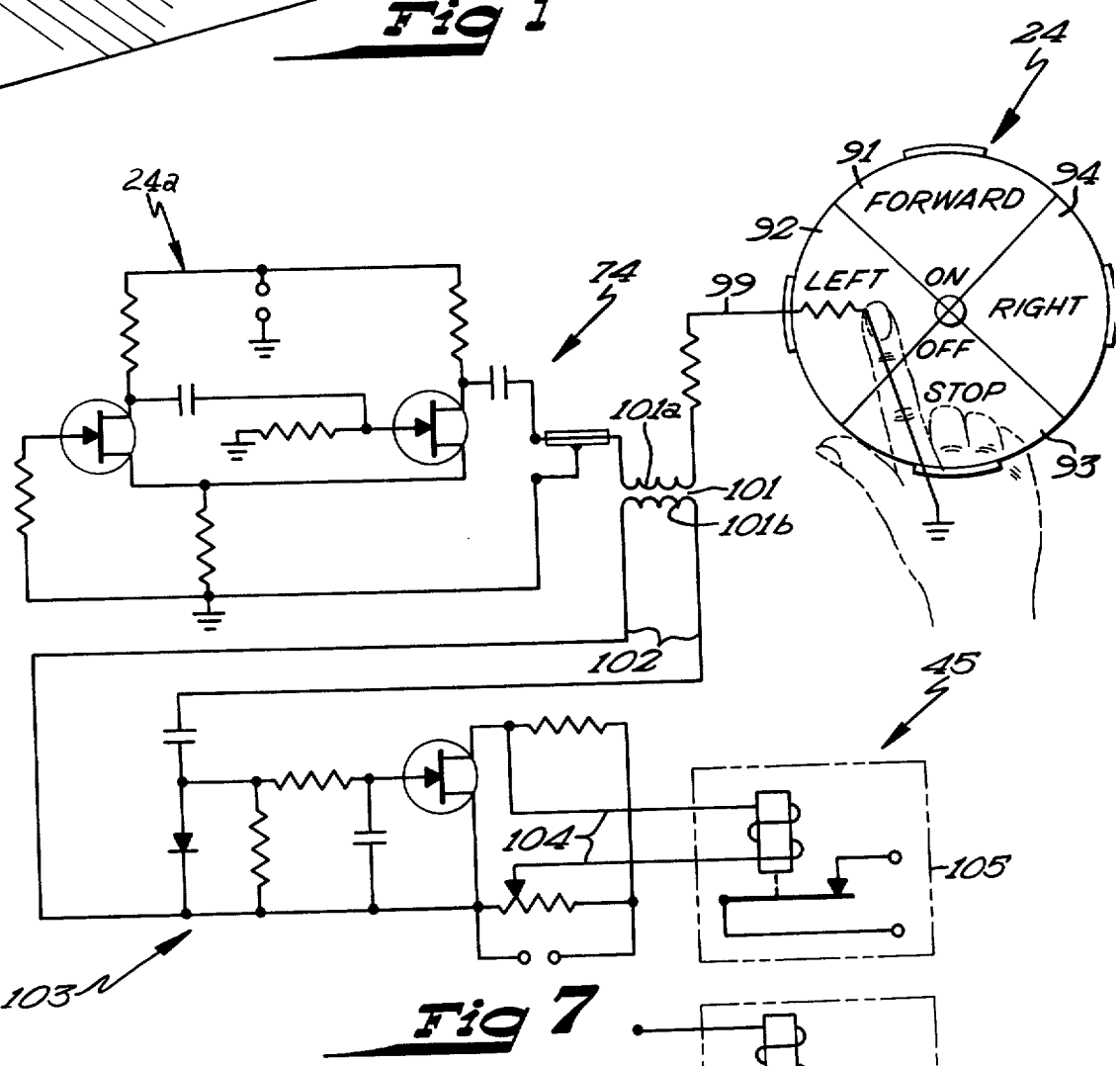
Fig 7
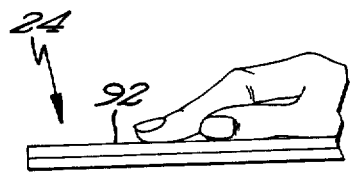
Fig 8
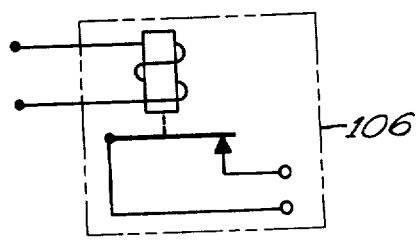

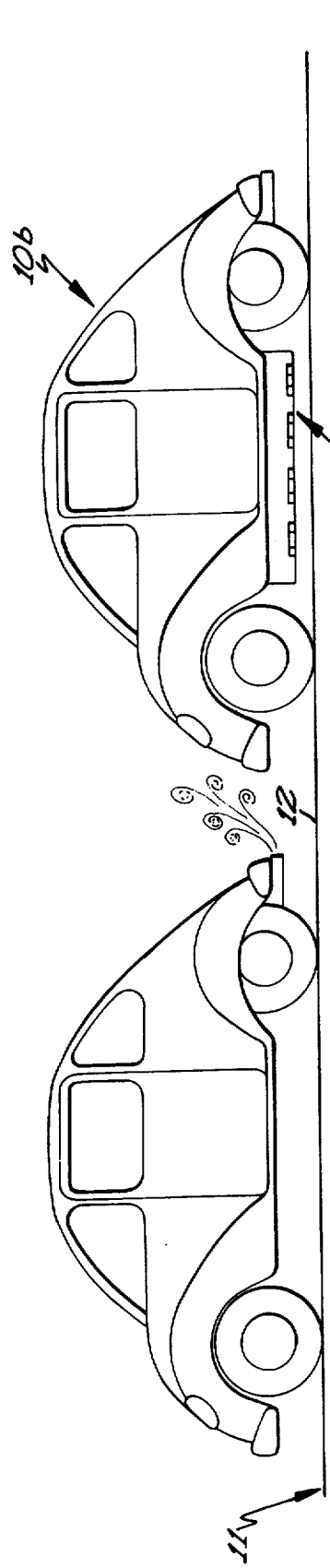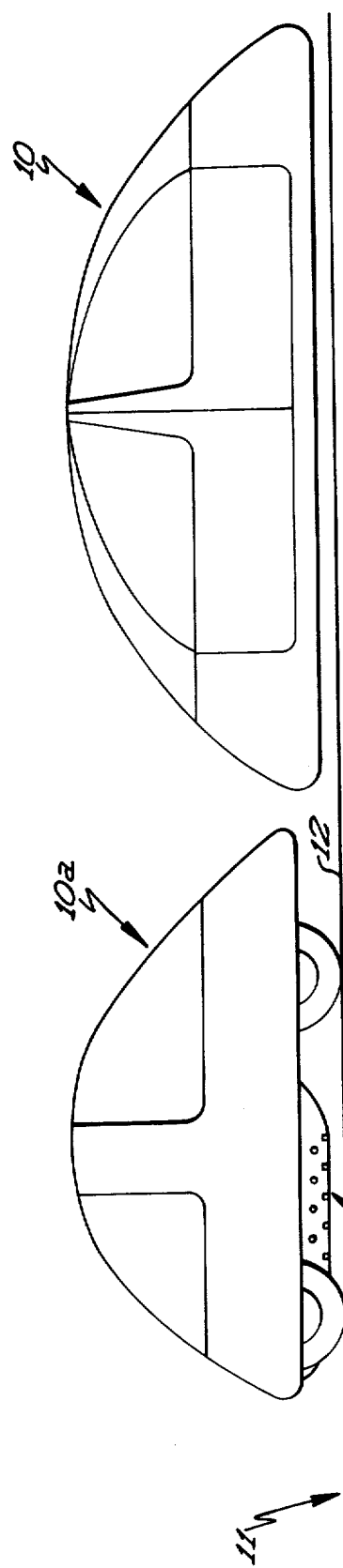

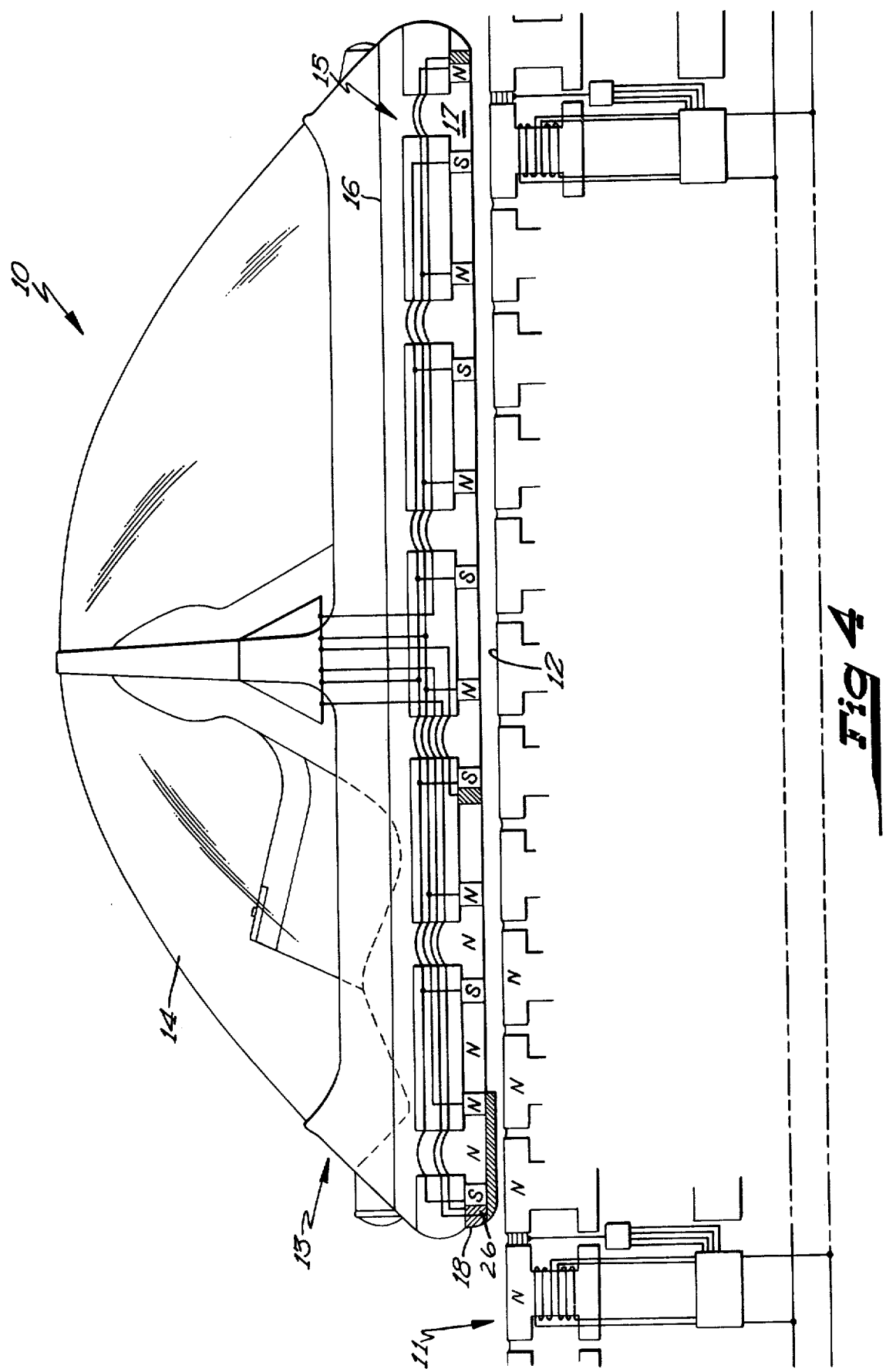

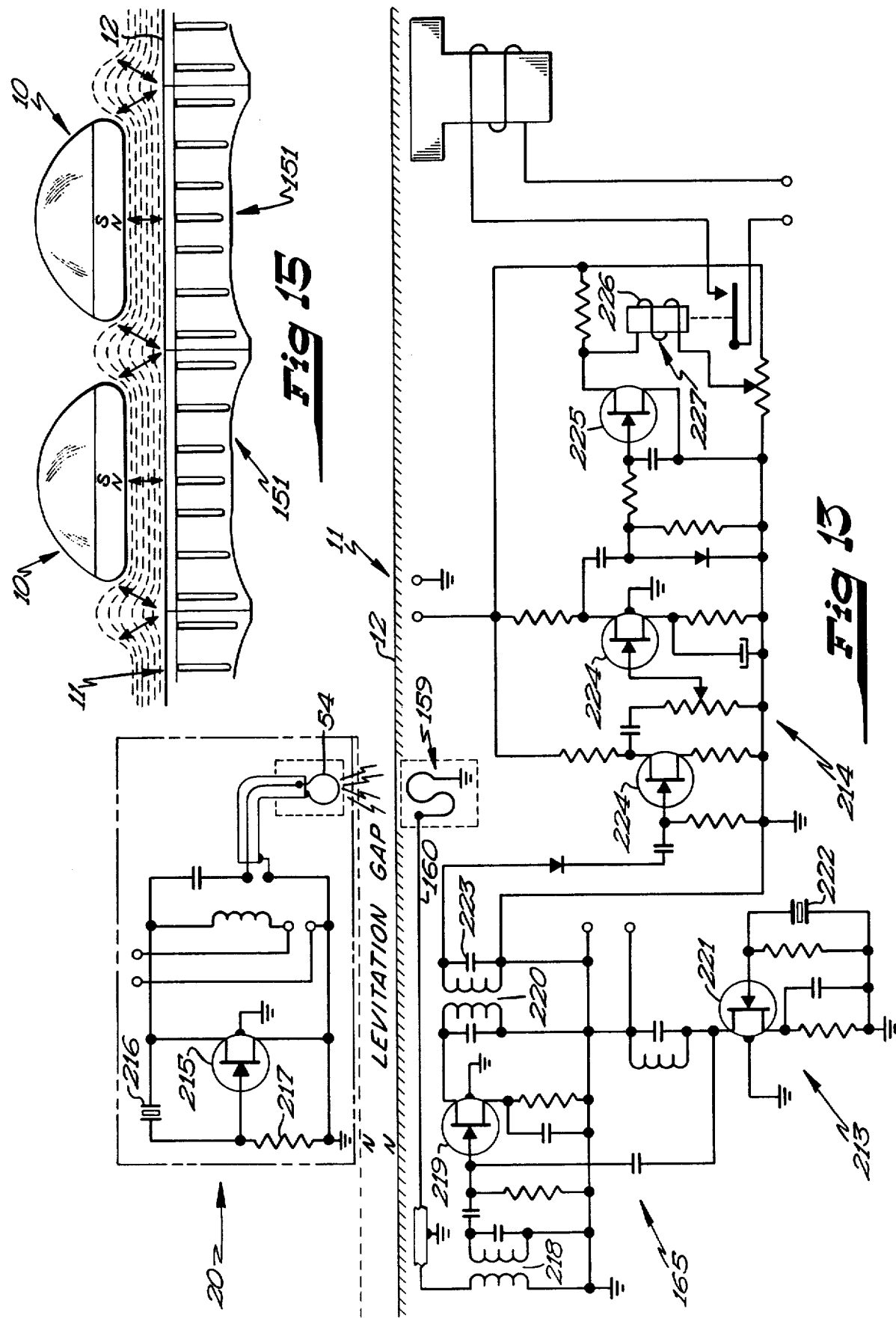

MAGNETIC PROPULSION SYSTEM

SUMMARY OF THE INVENTION

This invention relates to a magnetic propulsion system and more specifically to a vehicle which is levitated and propelled along a roadway by interacting magnetic fields.

It is a general object of this invention to provide a novel magnetic propulsion system which includes a vehicle provided with means for producing magnetic fields that control and interact with magnetic fields produced by field-producing means of a roadway to thereby permit levitation and propulsion of the vehicle with respect to the roadway.

More specifically, the vehicle is provided with control means which directs high-frequency signals to signal-receiving means associated with the roadway to selectively energize field-producing levitation and thrust elements of the roadway, which produce magnetic fields that interact with magnetic fields produced by the vehicle to thereby not only permit the vehicle to move in a forward or rearward direction with respect to the roadway, but to change lanes as desired. In this respect, the roadway, which has a general planar upper surface, is also provided with field-producing elements which produce partition fields between lanes that normally prevent a vehicle from moving in a lateral direction, but which may be de-energized by control means in the vehicle to permit lane changing as desired. The particular kinds of vehicles used in the present propulsion system may be specifically constructed magnetic vehicles or alternatively, conventional type vehicles may be used which are provided with field-producing attachments for the vehicle.

These and other objects and advantages of this invention will more fully appear from the following description made in connection with the accompanying drawings wherein like reference characters refer to the same or similar parts throughout the several views.

FIGURES OF THE DRAWINGS

FIG. 1 is a front perspective view of a portion of the magnetic highway, illustrating vehicles traveling thereover;

FIG. 2 is a side elevational view of a pair of vehicles one of which has a magnetic propulsion attachment mounted thereon;

FIG. 3 is a side elevational view similar to FIG. 1 illustrating a pair of magnetically propelled vehicles;

FIG. 4 is a side view partly in section and partly in elevation illustrating a magnetic vehicle in detail and illustrating a portion of the roadway;

FIG. 7 is a detailed electrical schematic or diagrammatic view of the left or right bias amplifier circuits for the vehicle;

FIG. 8 is a fragmentary side-elevational view of a portion of the control panel;

FIG. 13 is a detailed electrical schematic or diagrammatic view of a tuner circuit for a grid segment of the roadway and of a vehicle transducer oscillator;

FIG. 14 is a detailed electrical schematic or diagrammatic view of the circuit on a grid segment for preventing collision of trailing vehicles and FIG. 15 is a diagrammatic view illustrating generally in cross-section the profile of the magnetic field.

DESCRIPTION OF THE PREFERRED EMBODIMENTS

Figure 5:
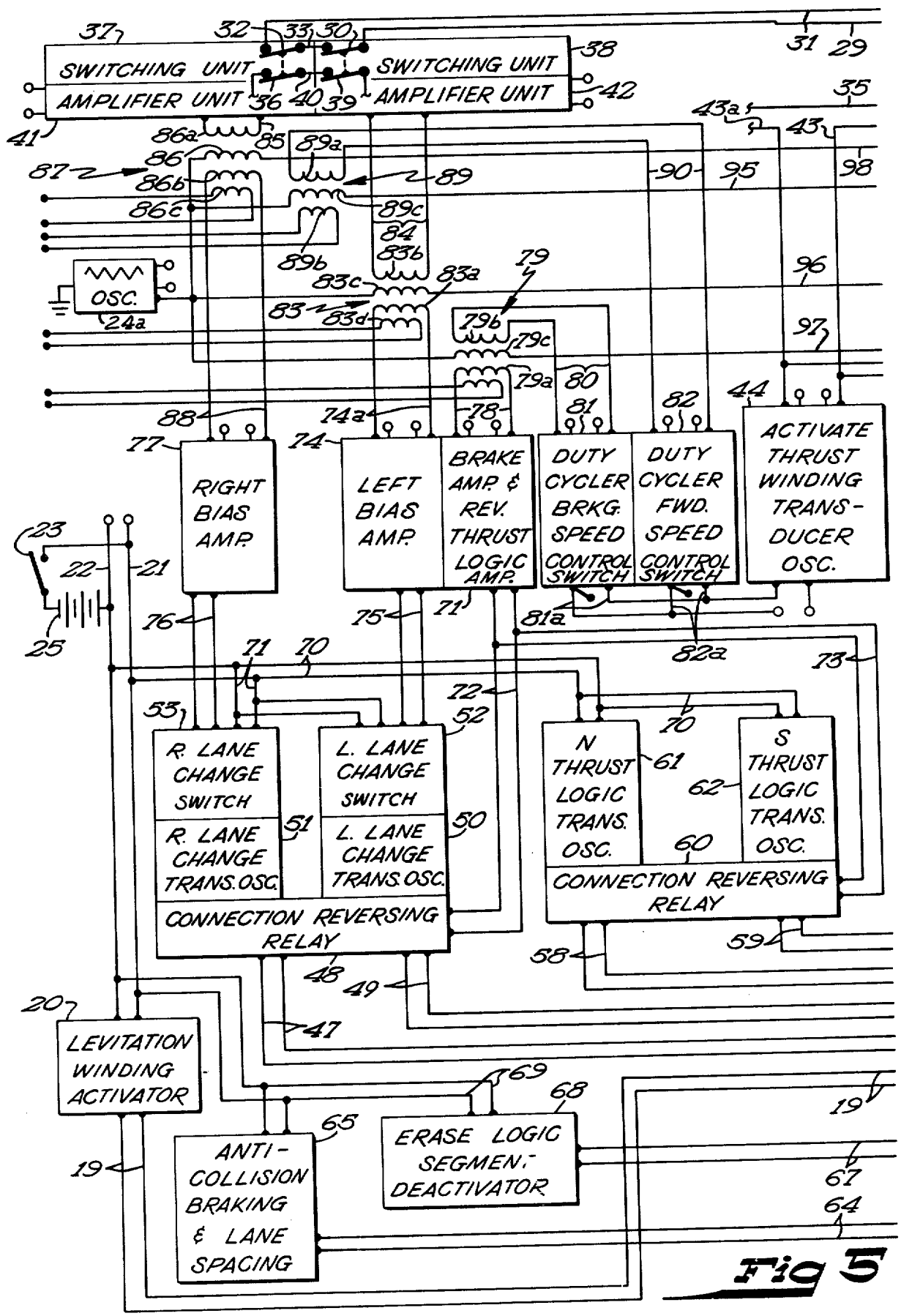
FIG. 5 is a general diagrammatic view of a portion of the circuitry of the magnetic vehicle.

Referring now to the drawings and more specifically to FIG. 4, it will be seen that one embodiment of my novel magnetic propulsion system is there shown. The magnetic propulsion system includes a vehicle 10 which is adapted to be propelled along, but in spaced relation above the magnetic roadway 11. It will be noted that the magnetic roadway 11 has a generally planar upper surface 12. The vehicle 10 is comprised of a body 13 having a suitable passenger compartment 14 which accommodates passengers and the operator therein. The lower surface of the vehicle body has levitation field-producing means mounted thereon and this means comprises a permanent magnet 15, which as shown, is in the form of an elongate plate or base 16 having a plurality of similar elongate transverse levitation segments 17 projecting downwardly therefrom. The permanent magnets 15 are spaced apart throughout the length of the lower surface of the vehicle body and the plate 16 thereof has a south polarity while each of the levitation segments 17 has a north polarity. As an alternate form, a plurality of smaller permanent magnets could be provided or a plurality of electromagnets could also be used.

Referring now to FIG. 4, it will be seen that the levitation segments 17 are illustrated as extending throughout the width of the vehicle. The vehicle is also provided with a plurality of signal-producing means which transmit the ultrahigh-frequency signals to signal-receiving means on the magnetic roadway. This signal-producing means includes a levitation transducer or transmitting antenna which is located at the forward portion of the vehicle adjacent the lower surface thereof and which extends substantially throughout the transverse dimension of the vehicle. When the levitation transducer 18 is energized, it produces an ultrahigh-frequency signal which is transmitted to certain signal receiving means located on the magnetic roadway. It will be noted that the levitation transducer 18 is connected by electrical conductors 19 to a levitation winding activator oscillator 20. A levitation winding activator oscillator 20 is connected by electrical conductors 21 and 22 which are connected to the master switch 23 of the control panel 24. The master switch is connected to a source of electrical current such as the batteries 25 and is a manual single-throw type but may be a touch type so that the master switch will be closed when the switch is grounded by an operator by merely touching the on-off area of the master switch.

A partition field transducer is positioned rearwardly of the levitation transducer 18 and is mounted adjacent the lower surface of the vehicle body and energizes partition field-producing means associated with the roadway. The partition fields when energized serve to prevent a vehicle during its movement along the magnetic roadway from moving out of the predetermined lane. A partition field transducer 26 is connected by an electrical conductor 27 to a partition field booster winding activator oscillator 28 on the car. The partition field transducer is connected by a conductor 29 to one contact of a relay switch 30. An electrical conductor 31 connects the oscillator 28 to a switch 32. The switches 30 and 32 each have one terminal thereof interconnected in series by a conductor 33.

Figure 6:
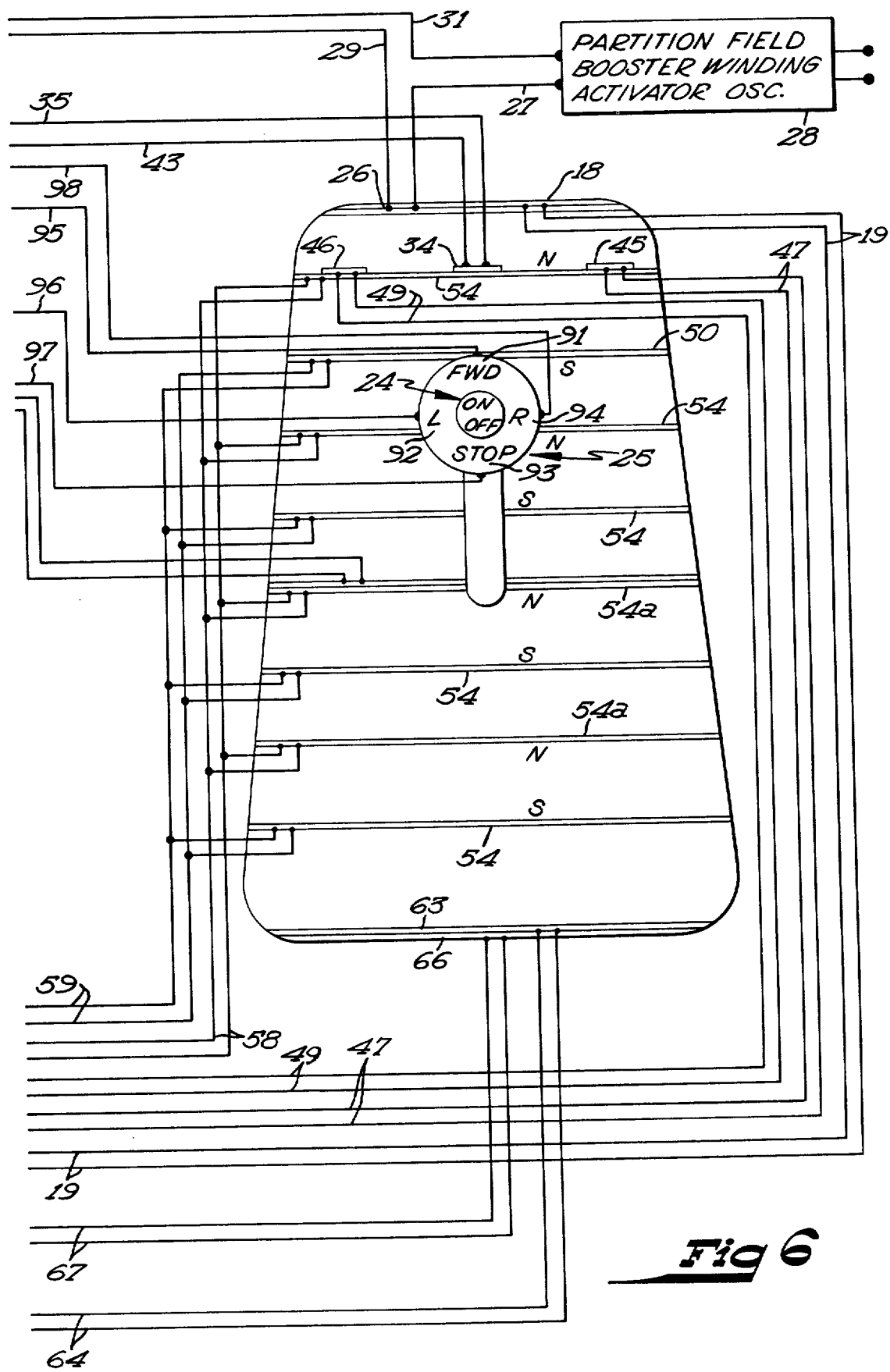
FIG. 6 is a diagrammatic view illustrating the remaining portion of the circuitry for the vehicle.

A thrust logic master switch transducer 34 is positioned in spaced relation rearwardly of the partition field transducer 26 and is located centrally of the vehicle, as best seen in FIG. 6. An electrical conductor 35 connects the thrust logic master switch transducer 34 to one terminal of a relay switch 36 of a switching unit 37. The switching unit 37 is one of a pair of switching units, the other switching unit 38 also being provided with a switch 39. One terminal of the switch 36 and the switch 39 are interconnected in series to be activated by amplifier units 41 and 42.

An electrical conductor 43 interconnects the thrust logic master switch transducer 34 to an activator thrust winding transducer oscillator 44. The oscillator 44 is connected by an electrical conductor 43A to one terminal of switch 39 and it will be noted that switches 32 and 30 are respectively mechanically connected to switches 39 and 36 so that both are activated by the same relay coil.

Referring again to FIG. 6, it will be seen that the vehicle 10 is provided with a left lane changing transducer 45 and a right lane changing transducer 46 positioned on opposite sides of the thrust logic master switch transducer 34. The left lane changing transducer 45 is connected by suitable conductors 47 to a connection reversing relay 48, as best seen in FIGS. 5 and 6. The connection reversing relay 48, is electrically connected to a left lane change transducer oscillator 50 and to a right lane change transducer oscillator 51. Oscillator 50 is electrically connected to a left lane change activating switch 52 while oscillator 51 is electrically connected to a right lane change activating switch 53. The right lane changing transducer 46 is also connected by suitable electrical conductors 49 to the connection reversing relay 48.

The vehicle is also provided with a plurality of longitudinally spaced apart elongate thrust logic transducers which are connected by conductors 58 and 59 to a connection reversing relay 60. It will be noted that the connection reversing relay is electrically connected to a north thrust logic transducer oscillator 61 and a south thrust logic transducer oscillator 62. The vehicle 10 also has an anticollision braking and lane spacing setup transducer 63 mounted on the lower portion thereof adjacent the rear of the vehicle and transducer 63 is connected by suitable electrical conductors 64 to an anticollision braking and lane spacing oscillator 65.

The vehicle 10 also has a field de-energizing transducer 66 mounted adjacent the rear end thereof and this transducer 66 is connected by suitable conductors to an erase logic segment deactivator oscillator 68. The erase logic segment deactivator oscillator is connected in parallel by conductor 69 to the anticollision braking and lane spacing oscillator 65 and to electrical conductors 21 and 22. The north thrust logic transducer oscillator 61, south thrust logic transducer oscillator 62 are connected in parallel by conductors 70 to the electrical conductors 21 and 22. The left lane change activating switch 52 and the right lane change activating switch 53 in parallel to the conductor 70 by conductors 71.

A brake and reverse thrust logic amplifier 71 is connected in parallel by conductors 72 and 73 to the connection reversing relay 48 and the connection reversing relay 60. The brake and reverse thrust logic amplifier actually constitutes a component of the unit which also includes a left bias amplifier 74 which is connected by electrical conductors 75 to the left lane change activating switch 52. The right lane change activating switch 53 is connected by electrical conductor 76 to the right bias amplifier 77.

The brake and reverse thrust logic amplifier 71 is connected by electrical conductors 78 to the secondary winding 79a of the transformer 79. The duty cycler braking speed control switch 81 is connected by electrical conductors 80 to the secondary winding 79b of the transformer 79. The left bias amplifier 74 is connected by conductors 74a to the secondary winding 83a of the transformer 83. Secondary winding 83b of transformer 83 is connected by electrical conductors 84 to the amplifier unit 42. Electrical conductors 85 connect the amplifier unit 41 to the secondary winding 86a of a transformer 87. Secondary winding 86b of transformer 87 are also connected by electrical conductors 88 to the right bias amplifier 77. The secondary winding 89a of the transformer 89 are connected by conductors 90 to the duty cycler forward speed control switch 82. The duty cycler braking speed control switch 81 and the duty cycler forward speed control switch 82 are actually components of a single unit. The duty cycler forward speed control switch 82 and the duty cycler braking speed control switch 81 are connected to the activate thrust winding transducer oscillator by conductors 81a and 82a.

Referring again to FIGS. 5 and 6, it will be seen that the control panel 24 not only includes the master switch 23 but is also arranged in quadrants including a forward quadrant 91 a left quadrant 92, a stop quadrant 93, and right quadrant 94. The control panel 24 is a touch type and an operator may energize a selected quadrant by touching the quadrant. It will be noted that the forward quadrant 91 is connected by an electrical conductor 95 to the primary winding 89c of the transformer 89. The left quadrant 92 is connected by an electrical conductor 96 to the primary winding 83c of the transformer 83. The stop quadrant 93 is connected by an electrical conductor 97 to the primary winding 79c of the transformer 79 and the right quadrant is connected by an electrical conductor 98 to the primary winding 86 of the transformer 87.

Referring now to FIG. 7, it will be seen that a detailed electrical schematic is shown of the left bias amplifier circuitry and it is pointed out that this circuitry is identical to the right bias amplifier circuitry. It will be noted that the left quadrant 92 of the control panel 24 is connected by an electrical conductor 96 to an oscillator circuit 100. The oscillator circuit 100 is commercially available and has a 2000 cycle 10 volt output capacity. It is thought that a detailed description of the oscillator circuit is unnecessary since such circuits in addition to being commercially available are well-known in the art. It will be noted that the electrical conductor 99 is connected to the primary winding 101a of a transformer 101, the other contact of the primary winding being connected to the oscillator circuit. It will further be noted that the secondary winding 101b of the transformer 101 is connected by conductors 102 to an amplifier circuit 103. The amplifier circuit 103 is also commercially available and a detailed description of this circuit is thought to be unnecessary since it is also well-known in the art. The amplifier circuit is connected by conductor 104 to the left lane changing transducer 50 which as shown, includes an activating relay switch unit 52 and a steering shut off relay switch unit 106. Again it is pointed out that all of the transducers are ultrahigh-frequency transmitting antennas which transmit signals to certain magnetic units of the magnetic roadway 11. FIG. 7 clearly illustrates how an operator energizes through grounding, the various components of the vehicle when the control panel is touched.

Figure 9:
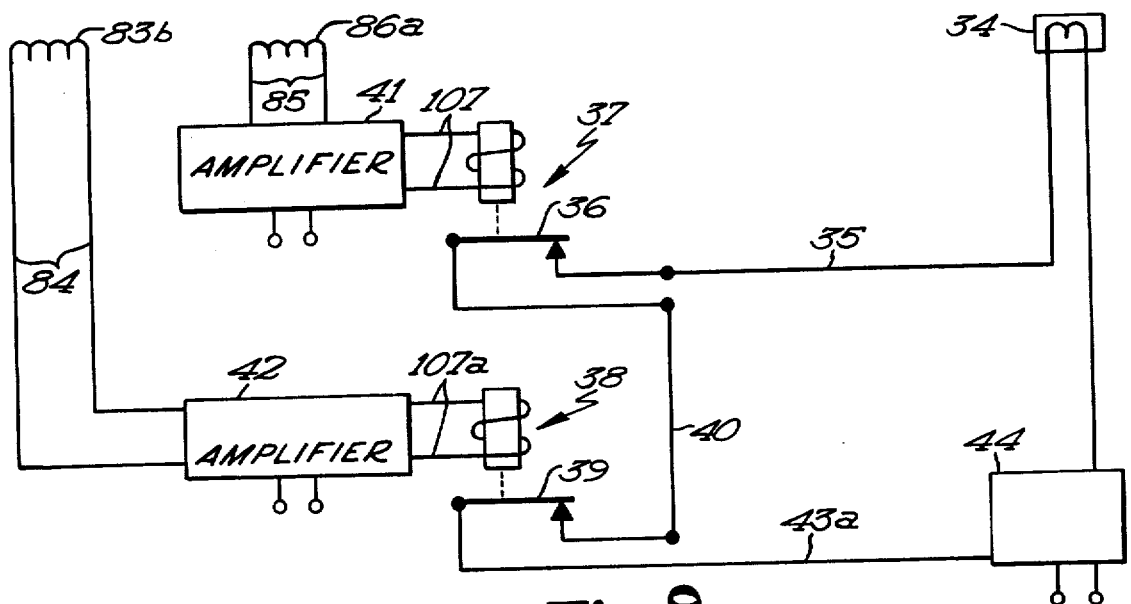
FIG. 9 is a detailed electrical schematic or diagrammatic view of a portion of the steering circuitry for the vehicle.

Referring now to FIG. 9, it will be seen that a more detailed illustration of the amplifying switching units which control the thrust logic master switch transducer 34 are shown. It will be seen that the amplifying unit 41 is connected by electrical conductors 107 to the relay switching unit 37. One terminal of the switch 36 is connected by conductor 35 to a transducer 34. The amplifier unit 42 is connected by electrical conductor 107a to the relay switching unit 38. As pointed out above, the switch 39 of the relay switching unit 38 has one contact thereof connected by electrical conductor 43a to the activate thrust winding transducer oscillator 44. The respective other terminals of switch 36 and 39 are respectively connected by an electrical conductor 40.

Figure 10:
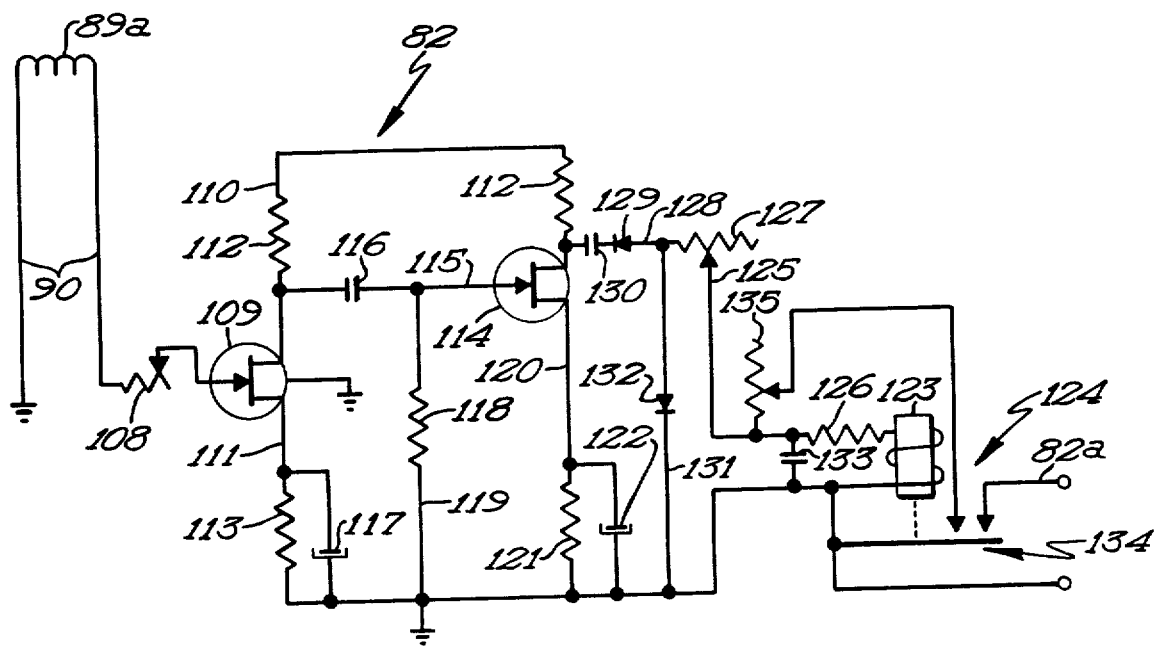
FIG. 10 is a detailed electrical schematic or diagrammatic view of the duty cycler circuit for the vehicle.

Referring now to FIG. 10, there is shown a detailed electrical schematic of the duty cycler forward speed control switch circuitry 82, and it is pointed out that this circuitry is substantially identical to the duty cycler braking speed control switch circuitry 81. It will be noted that one of the conductors 90 connected to the secondary winding 89a of the transformer 89 is grounded and the other conductor is connected to a contact of a potentiometer 108. The other contact of the potentiometer is connected to one contact of a field-effect transistor 109. The transistor 109 is connected to electrical conductor lines 110 and 111 and the transistor also has a ground shield. A pair of resistors 112 are disposed in the conductor line 110 and a resistor 113 is disposed in the conductor line 111. One contact of a field-effect transistor 114 is connected to conductor 110 and another contact of the transistor 114 is connected by electrical conductor 115 to the conductor 110 but across the resistors 112. It will be noted that a condenser 116 is disposed in the conductor line 115. A time constant electrolytic condenser 117 is connected across the resistor 113 in the conductor line 111. A resistor 118 is connected across the transistor 109 by conductor 119 which extends between and is connected to conductor 115 and conductor 111. It will be noted that conductor 111 is grounded and is connected by conductor 120 to the transistor 114. A resistor 121 is disposed in the conductor line 120 and a time constant electrolytic condenser 122 is connected across the resistor 121. These components constitute a gate circuit for the duty cycler forward speed control switch unit 82 and this control switch unit also includes a relay circuit which is connected to and controls operation of the activate thrust winding and transducer oscillator.

The relay circuit includes a relay coil 123 of normally open relay 124, and one contact of the relay coil is connected by the conductor line through the resistor 117. The other contact of the relay coil is connected by conductor 125 through the resistor 126 and the conductor 125 is also connected to one contact of a potentiometer 127. A diode 129 and condensor 130 are disposed in series in the conductor line 128. The field-effect transistor gate circuit is therefore connected to the leakdown circuit which includes diode 129 and potentiometer 127. A diode 132 is connected across the relay 124 by a conductor 131 which interconnects conductors 111 and 128. The condensor 133 is connected across the relay 124 and a potentiometer 135 is connected in parallel to the condensor 133 and across the relay 124.

Figure 11:
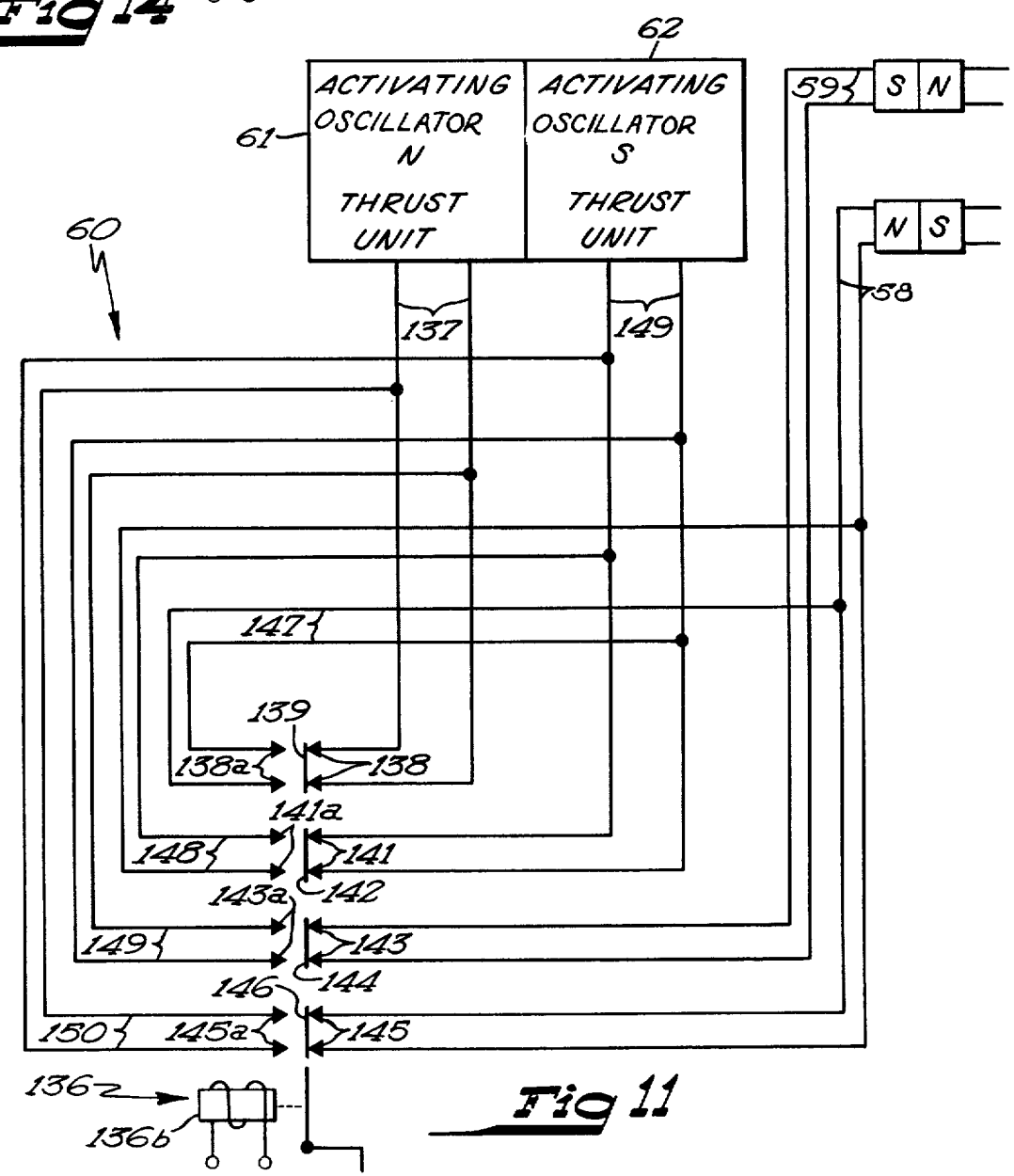
FIG. 11 is a detailed electrical schematic or diagrammatic view of the reverse connections relay circuitry for the vehicle.

Referring now to FIG. 11, it will be seen that a detailed electrical schematic of the connection reversing relay is there shown. The function of this connection reversing relay is to reverse the polarity of the thrust transducers on the vehicle during operation of the vehicle to therby permit braking of the vehicle. It is also pointed out that connection reversing relay 60 is illustrated in FIG. 11, and this relay is substantially identical to the connection reversing relay 48. The connection reversing relay 60 includes a relay coil 136 having a relay core 136a movable therein. The relay core operates a plurality of switches during the connection reversing operation. To this end, it will be seen that the oscillator 61 is connected by conductors 137 to the switch contacts 138 of a switch 139. The oscillator 62 is connected by conductors 149 to the switch contacts 141 of switch 142. The conductors 59 which are connected to the south thrust logic transducers on the vehicle are connected to a switch contact 143 of switch 144. Similarly, the conductors 58 which are connected to the north thrust logic transducers on the vehicle are connected to switch contacts 145 of switch 146. The relay core simultaneously operates switches 139, 142, 144 and 146 in a well-known manner.

Switch contacts 138a of switch 139 are connected by conductors 147 to the oscillator 62 and to one of the conductors 58 for the north thrust logic transducers on the vehicle. Switch contacts 141a of switch 142 are connected by conductors 148 to the oscillator 62 and to the other conductor 58 for the north thrust logic transducers 54a on the vehicle. Switch contacts 143a of switch 144 are connected by conductors 149 to the oscillator 61 and oscillator 62. Switch contacts 145a of switch 146 are connected by conductors 150 to oscillator 61 and 62. The relay 136 is normally not energized during operation of the vehicle, and when the relay is in a de-energized condition, the various north thrust transducers on the vehicle receives a signal from the north thrust logic oscillator circuits 62, and the south thrust transducers 54 on the vehicle receives a signal from the south thrust logic transducer oscillator 61. However, when the relay 136 is energized, the signals conducted from the north thrust transducer oscillators 61 is conducted to the south thrust transducers 54 and the signals from the south thrust transducer oscillator 62 is conducted to the north thrust transducers 54a. The polarity of the transducers on the vehicles is changed and these transducers, rather than producing thrust, produce a braking action.

Figure 12:
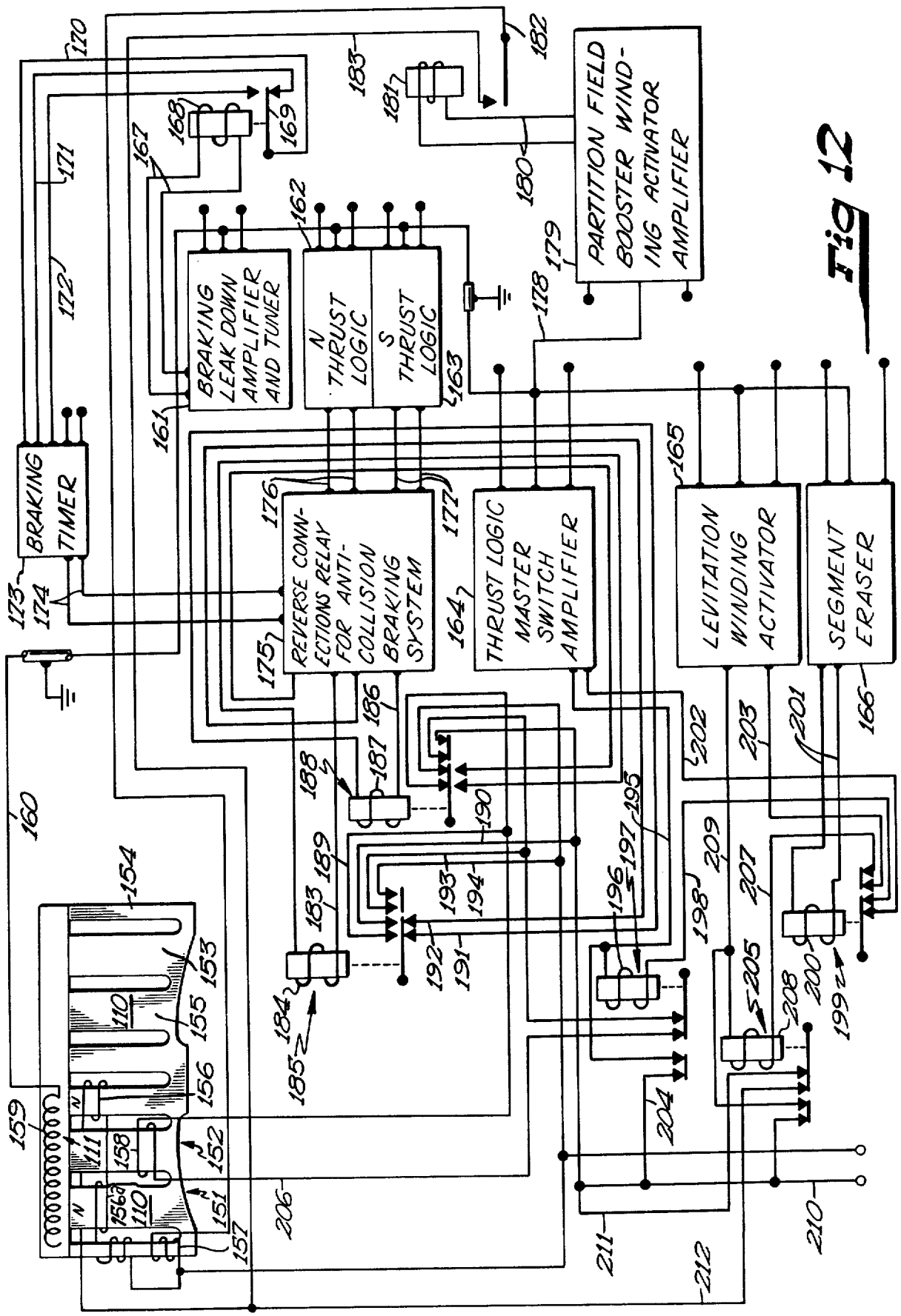
FIG. 12 is a general diagrammatic view of a grid segment of a roadway.

Referring now to FIG. 12, it will be seen that a grid segment and the circuitry associated therewith is there shown. Each grid segment, designated generally by the reference numeral 151 is comprised of a pair of lateral sections 152, each section being substantially identical and each having identical circuitry. In the embodiment illustrated in FIG. 12, the circuitry for only one lateral section is illustrated since the circuitry for the other lateral section is identical thereto.

Each lateral section 152 is comprised of a plurality of electromagnets, each magnet including a core and winding or coil. Thus, each lateral section includes a pair of laterally spaced apart levitation core members 153, a partition core member 154 and a thrust core member 155. In the embodiments shown, each core member is vertically oriented and each electromagnet when energized will define magnetic fields whose profile in section is diagrammatically illustrated in FIG. 15. In the embodiments shown, each lateral section includes a pair of levitation core members, a single partition core member and a single thrust core member.

Each levitation core member 153 has a winding 156 and each partition core member 154 has a winding or coil 157. Each thrust core member 155 has a winding or coil 158. Each lateral section of each grid segment is energized by the circuitry illustrated in FIG. 12. In this respect, each lateral section is provided with an inducer 159 which in the embodiment shown is an ultrahighfrequency receiving antenna. Thus each grid segment is provided with a pair of such inducers 159, each receiving a signal from the transducers on the vehicle.

Signals are fed from the inducer 159 by means of an electrical conductor line 160. A braking leakdown amplifier and tuner 161, a north thrust logic tuner 162, a south thrust logic tuner 163, a levitation and partition field winding activator and tuner 165 and a segment eraser and amplifier tuner 166 are all connected in parallel to the electrical conductor 160. The braking leakdown amplifier and tuner 161 is connected by electrical conductors 167 to the coil of a solenoid switch 168. A conductor 170 is connected to one of the switch contacts of the switch 169 while the other contacts of the switch are connected to conductors 171 and 172. Conductors 170, 171 and 172 are connected to a braking timer 173 which is connected by electrical conductors 174 to a reverse connections relay 175 for anticollision braking system. The reverse connections relay 175 is connected by electrical conductor 176 to the north thrust logic tuner 162 and is connected by electrical conductors 177 to the south thrust logic tuner 163. The thrust logic master switch amplifier and tuner 164 is connected by a conductor 178 to a partition field booster winding activator amplifier and tuner 179. The amplifier and tuner 179 is connected by electrical conductors 180 to the coil of the relay 181. The contacts of the relay switch 181 are connected to the winding 157 of one of the partition field magnets of a grid segment. It is pointed out that the windings for the levitation magnets and the partition magnets for each lateral section are serially connected.

The reverse connections relay 175 is connected to the coil 184 of a latching relay 185 by an electrical conductor 183. The reverse connections relay unit 175 is connected by conductor 186 to the coil 187 of a latching relay 188. One contact of the latching relay 185 is connected by conductor 189 to one contact of the latching relay 187. Another contact of the latching relay 185 is connected by conductor 190 to a second contact of the latching relay 188. One contact of the opposed set of contacts of the latching relay 185 is connected by conductor 191 to the coil 187 of the latching relay 188 while the other of the opposed contacts of latching relay 185 is connected by a conductor 192 to the reverse connections relay unit 175.

One of a pair of relay contacts for the latching relay 185 is connected to one of a pair of switch contacts of the latching relay 188 by a conductor 193. A conductor 194 interconnects another switch contact of the latching relay switch 185 to a switch contact of the latching relay 188. The conductor 193a is also connected to the electromagnet winding 158 of the thrust magnet for one of the lateral sections of the grid of the grid segment 151. The conductor 194 which interconnects switch contact points of the latching relay 185 with the latching relay 188 is also connected to the thrust winding 158 and to the partition field winding 157. It will be seen that the respective relay coils for the latching relay 185 and the latching relay 188 will be alternately energized. Thus, when the relay coil 184 for the latching relay 185 is energized, the relay coil 187 for the latching relay 188 will be de-energized.

The thrust logic master switch amplifier and tuner 164 is connected by conductor 195 to the relay coil 196 of the holding relay 197. The coil 196 of the holding relay 197 is also connected by a conductor 198 to a relay contact switch of holding relay 199. The coil 200 of holding relay 199 is connected by conductors 201 to the segment eraser amplifier and tuner 166. One of the switch contacts for the holding relay 199 is connected by conductor 202 to the amplifier and tuner 164 while another relay contact of holding relay 199 is connected to the amplifier and tuner 165 by a conductor 203. Another switch contact of the relay 197 is connected by conductor 204 to a relay contact of the latching relay 185 and to a relay contact of the latching relay 188. The conductor 204 is also connected to a relay contact of a holding relay 205. It will also be noted that one contact of the holding relay 197 is connected to coil of relay 196 which interconnects relay contacts of the latching relay 185 and the latching relay 188. Finally, it will be noted that the remaining relay contact of the holding relay 197 is connected by a conductor 206 to the winding 158 of a thrust magnet of one of the lateral sections of a grid segment 151.

One of the relay contacts of the holding relay 199 is connected by a conductor 207 to the relay coil 208 of the holding relay 205. It will also be noted that the coil 208 of the holding relay 205 is connected by a conductor 209 to the activator and tuner 165. One of the relay contacts of the holding relay 205 is connected to conductor 209 and another contact is connected to conductor 210 which is connected in parallel to relay contact of latching relay 185 and latching relay 188. Another relay contact of the latching relay 205 is connected to conductor 211 which in turn is connected to relay contacts of the latching relay 185 and 188. The remaining contacts of the holding relay 205 is connected by conductor 212 to the conductor 183 and to the windings 157 of the partition magnet and levitation magnetic windings 156 and 156a for a lateral section 152 of the grid segment 151. Again, it is pointed out that the circuitry illustrated in FIG. 12 is a circuitry for one lateral section only of a grid segment, the other lateral section having a circuitry identical to the circuitry of FIG. 12.

Referring now to FIG. 13, it will be seen that a detailed circuitry diagram is shown illustrating the circuitry of a levitation winding activator oscillator on the vehicle and a levitation and partition field and winding amplifier and tuning circuit for a lateral section of a grid section. It will be noted that the circuitry for the oscillator 20, which is feedback oscillator, includes a field-effect transistor 215 and a frequency control crystal 216 connected across the field-effect transistor. When negative voltage flows through the resistor 217, bias is produced and opens the gate of the field-effect transistor 215 and current is shunted through the transistor and the signal is then fed to the transducer 54 by discharging condenser 216a. The circuit includes the field-effect transistor 215, the frequency control crystal 216 and the resistors 217a and 217. The frequency is therefore controlled by the frequency control crystal 216.

The signal is transmitted to the inducer or UHF antenna 159 and it is fed by the conductor 160 to one of a plurality of components of the circuitry illustrated in FIG. 12. The component illustrated in FIG. 13 of a roadway grid segment comprises a field activator amplifier and tuner 165. This component includes a tuning circuit 213 and an amplifying circuit 214. The signal is fed into the transformer 218 and to the UHF amplifier of the tuning circuit 213. The UHF amplifier for the tuning circuit includes a field-effect transistor 219 and a transformer 220. The tuning circuit 213 also includes a field-effect transistor 221 which functions as an oscillator mixer. The oscillator mixer and transistor 221 is crystal controlled by a frequency control crystal 222 which is connected to the gate field-effect transistor 221. The secondary coil of the transformer 220 together with the condenser 223 actually constitutes a frequency resonant circuit of predetermined frequency. In the embodiments shown, for example, the selected frequency is 40 megacycles. Thus signals received from the crystal controlled converter 221 and the field-effect transistor amplifier are fed to the transformer 220 and a signal of predetermined frequency is passed through the secondary coil of the transformer to the amplifier circuit 214. This frequency is well-known in the art, and is known as the intermediate or superheterodyne frequency.

The signal is fed into the amplifying circuit 214 through the field-effect transistors 224 which performs a straight amplification function into the output transistor 225, through the winding 226 of the magnetic function relay 227. It will be seen that when the relay 227 is energized, the signal is fed to the electromagnet of the grid segment, which as shown, is a levitation magnet.

OPERATION

During operation of a magnetic vehicle 10 on the magnetic roadway 11, the master switch 23 of the control panel 24 will be closed and thereby energize various components on the vehicle. In this respect, the amplifier unit 41 for the switching unit 37, the amplifier unit 42 for the switching unit 38 the oscillator 24a for the control panel, the right bias amplifier 77, the left bias amplifier 74, the brake and reverse thrust logic amplifier 71, the duty dycler braking speed control switch 81, the duty cycler forward speed control switch 82, and the thrust winding transducer oscillator 44 will all be energized upon closing of the master switch. It is also pointed out that when the master switch is closed, the levitation winding activator oscillator 20 will be energized and a UHF signal will be conducted to the levitation transducer or UHF antenna 18 located at the front of the vehicle. The transducer 18 will transmit UHF signals to the inducers of the adjacent grid segments and these signals will be transmitted through the conductor 160 to the levitation and partition field winding activator and tuner 165 on the grid segment.

First of all, it is pointed out that the transducer 18 transmits a UHF signal of a predetermined frequency only, and in the embodiments shown, the frequency is 115 megacycles. The activator and tuner 165 of the grid segment circuitry, is tuned to receive only a signal of 115 megacycles while each of the other amplifier and tuner units of the grid segment are accordingly tuned to receive signals of a predetermined frequency.

When the levitation and partition field winding activator and tuner 165 is energized, the relay 205 will be energized which in addition to conducting a signal to the levitation magnets of the grid segment also conditions the other relays (185 and 188) shown in FIG. 12, for operation. It is pointed out that in order to start the vehicle in a levitated condition, a starting area having permanently energized levitation magnets will be provided. Other means, such a mechanical ramps, for moving the vehicle above the surface of the roadway may be provided for producing the initial levitation.

An operator then may touch the forward quadrant 91 on the control panel 24 and when this occurs, the duty cycler forward speed control switch 82 receives a signal from the transformer 89. Referring now to FIG. 10, it will be seen that the amount of current passing through the potentiometer 108 will be determined by the position of the operator's hand or finger with respect to the forward quadrant 91. The closer the operator touches the forward quadrant with respect to the forward periphery thereof, the greater the bias through the potentiometer 108. The signal is amplified through the first stage field-effect transistor 109 and through the second stage field-effect transistor 114 and the relay 124 functions as a leakdown relay. When the relay 124 is closed, the condenser 133 will discharge through the resistor 135. The relay 124 will be de-energized and opened after the condenser 133 has discharged and when the current through the linear amplifier transistor 109 and transistor 114) is not sufficient to hold the relay in the closed condition. The duty or time function of the duty cycle circuit, illustrated in FIG. 10, is therefore a function of the proximity of the operator's finger with respect to the nonresistive portion (forward) of the forward quadrant 21. In other words, the closer the operator's finger is to the forward portion of the periphery of the forward quadrant, the longer the relay 124 will be maintained in a closed condition. In this respect, when an operator is touching the forward quadrant 91 adjacent or at the outer periphery thereof (nonresistive portion) current from the transformer 89 will be sufficiently strong to overcome the leakdown resistor 135 even during its leakdown phase, to constantly energize and close the relay 124. As an alternative to the duty cycler circuit illustrated in FIG. 10, a circuit could be provided which upon receiving a signal of predetermined modulation would energize only selected thrust electromagnets on the road gridway and upon reception of a different modulated signal, would energize either a greater or lesser number of grid segments, depending upon the modulation of the signal.

The signal conducted through the duty cycler forward speed control switch 82 will be conducted to the activate thrust winding transducer oscillator 44. The signal is then conducted to the thrust logic master switch transducer 34. This UHF signal is received by the adjacent inducer 159 on the grid segment and is conducted by the inducer conductor 160 to the thrust logic master switch amplifier and tuner 164. Again, it is pointed out that the transducer 34 transmits at a frequency which is received only by the amplifying tuner 164. In the embodiment shown, a frequency of 105 megacycles is transmitted by transducer 34 and received by the thrust logic master switch amplifier and tuner 164. The signal is then conducted to the holding relay 197. The relay 197 will be closed and when this occurs, the latching relays 185 and 188 will be conditioned for operation when a signal is received from the reverse connections relay unit 175. It is pointed out that other components such as silicon control rectifiers could be used in place of the latching relays 185 and 188, and the holding relays 197, 199 and 205.

It is pointed out that when the master switch for the vehicle is closed, the north thrust logic transducer oscillator 61 and the south thrust logic transducer oscillator 62 will be energized thereby causing the south thrust transducers 54 and the north thrust transducer 54a on the vehicle to transmit signals of predetermined frequency t the grid segments on the roadway. These signals from the thrust transducers on the vehicle will be transmitted to the inducers on the grid segment and the signals received to be conducted by the inducer conductor 160 to the north thrust logic amplifier and tuner 162 and the south thrust logic tuner and amplifier 163. Again, it is pointed out that the north thrust logic tuner and amplifier 162 is tuned to receive signals having a predetermined frequency and in the embodiments shown, this frequency is, as an example, 135 megacycles. It is also pointed out that with respect to each lateral section of a grid segment, either the north thrust logic tuner and amplifier 62 or the south thrust logic tuner and amplifier 163 will receive a signal and be energized at any given time. These thrust tuners and amplifiers are therefore alternatively energized or activated. The south thrust logic tuner and amplifier 163 is also tuned to receive a signal of predetermined frequency and in the embodiments shown, this signal is 195 megacycles. Correspondingly, when the vehicle is moving forwardly, the north transducers 54a on the vehicle transmit a signal whose frequency is 135 megacycles and the south transducers 54 on the vehicle transmit a signal of 195 megacycles.

The signals received by the north thrust logic tuner and amplifier 162 and the south thrust logic tuner and amplifier 163 will be respectively conducted through the reverse connections relay component 175 and through the latching relay circutis to the thrust winding of the thrust electromagnets on the grid segments. It is pointed out that the latching relays are in the nonreversing condition when the vehicle is traveling in a forward direction. When the thrust magnets on the grid segments are energized, a magnetic field will be produced and will interact with the magnetic field produced by the magnets on the vehicle. Again it is pointed out that the magnetic field produced by the vehicle magnets has a constant polarity as shown in FIG. 4 of the drawings. It will be appreciated that as the vehicle is moved in a forward direction, the leviation transducer 18 will successively energize the levitation magnets on the grid segments as the front of the vehicle comes into proximity with such grid segments. Thus constant levitation of the vehicle is maintained by this interaction of the magnets on the vehicle and the levitational magnets on the grid segments. In this respect, the vehicle magnets will interact with the levitation magnets on the grid segment and produce a repelling action and the resulting levitation.

When the thrust electromagnets of each grid section are energized, and the vehicle is traveling in a forward direction, the signal will be alternately received by the inducers on each grid segment from the north and south transducers on the vehicle. When the south transducer on the vehicle transmits a signal to the proximal grid segment inducer, a signal will be conducted to the thrust winding of the thrust magnet on the grid segment and this magnet will be located just forwardly of a proximal magnet on the vehicle. Since the vehicle magnet has polarity which is unlike the polarity of the proximal thrust magnet on the grid, the interaction of these fields will produce an attracting effect and pull the vehicle in a forward direction. As the vehicle is moved progressively in a forward direction, each vehicle magnet will eventually pass over the transverse center of each grid segment. When this occurs, the north transducer on the vehicle will then be moved in close proximal relation with the inducer on the grid segment and will transmit a signal to the inducer which will be conducted through the north thrust logic tuner and amplifier 162 and reverse the polarity on the segment to push or repel rather than attract. Thus the polarity of the thrust magnet on each segment will be instantaneously reversed so that the grid segment thrust magnetic field will be changed from south to north and interact with the fields on the vehicle to produce a repelling action. It will be seen that the thrust motion of the vehicle in a forward direction is a constant push-pull type action which is produced by constantly and progressively changing the polarity of the fields of each grid segment.

In the event that it is desirable to change lanes when moving in a forward direction, it will then be necessary to de-energize the partition fields.

Reference is now made to FIG. 15 of the drawings which diagrammatically illustrates the profile of the partition fields and their function of preventing movement of the vehicle in a lateral direction. If, for example, it is desirable to change to a left lane, an operator will push the left quadrant 92 on the control panel. It is pointed out that the operator will actually contact the control panel in an area located between direct forward and direct left depending upon the specific speed of forward movement desired. When the left quadrant is actuated, current will be induced through the transformer 83 to the left bias amplifier 74. The signal is then conducted to the left lane change activating switch 52 and through the left lane change transducer oscillator. The signal is then conducted to the connections reversing relay 48 through conductors 47 to thereby conduct a UHF signal to the transducer 45. When the transducer 45 is energized, this signal will be transmitted to only those lateral sections of each grid segment most proximal to the transducer 45. This signal will be received by each right lateral section inducer on each grid segment and will be conducted to the thrust logic master switch amplifier and tuner 164 and will energize only the thrust electromagnets of one right lateral section of each grid segment. Thus the forward thrust will be applied to only one side of the vehicle and in this instance to the right side, thus producing an uneven thrust to cause the forward portion of the vehicle to move in a left forward direction.

It will be appreciated that the partition field transducer 26 located adjacent the forward portion of the vehicle transmits signals which are received by the partition field booster winding amplifier tuner which energize the windings for the partition field magnets of each grip segment. Again, it is pointed out that the partition field booster field winding amplifier and tuner is tuned to receive a predetermined frequency only and in the embodiments shown, is a 125 megacycle signal. Accordingly, the partition field transducer 26 also transmits only a signal of 125 megacycles. Under normal operating conditions, the partition field transducer will be continuously energized and will transmit signals so that switches 30 and 32 will be closed as will switches 36 and 39. However, when the left bias amplifier (or alternatively, the right bias amplifier) is energized, current will be induced through the secondary windings of transformer 83 to transmit a signal to the amplifier unit 42. This signal operates the switching unit 38 and simultaneously opens switches 39 and 30 to thereby de-energize the thrust logic master switch transducer 34 which also serves to stabilize the car laterally and the partition field transducer 26. The removal of the partition fields permits movement of the vehicle in a forwardly and left lateral direction to the adjacent lane.

It it is desirable to stop the vehicle, the operator will touch the stop quadrant 93 of the control panel which energizes the brake and reverse thrust logic amplifier 71 from the transformer 79. The amplified signal will be transmitted to the connection reversing relay 48 and the connections reversing relay 60. The signal will also be received by the activate thrust winding transducer oscillator 44 through duty cycler braking control 81 and this will determine the amount of (braking) corresponding to the forward duty cycle function of the duty cycle forward speed control switch circuit 82. The signals that are conducted through the connection reversing relay 60 to cause the north thrust transducers 54a on the vehicle to transmit a south signal or at a frequency received by the south thrust logic tuner and amplifier 163. On the other hand, the south transducers 54 on the vehicle will then transmit a north signal which will be received only by the north thrust logic tuner and amplifier 162. The braking and anticollision function are functions of the braking timer 173. Thus the interaction of the magnets on the vehicle and each progressively energized grid segment will be reversed with respect to the operation which produces forward thrust. It will be appreciated that the vehicle will then be braked by the interacting magnet field on the vehicle and roadway respectively.

As the vehicle passes in a forward direction on the roadway, the magnetic function erase transducer 66 located at the rear of of the vehicle will transmit a signal to the inducers 159 of each grid segment as the transducer 66 passes over each grid segment. This signal is transmitted to the erase amplifier and tuner 156 for each lateral section of each grid segment, the amplifier and tuner 166 being tuned to receive a signal of 60 megacycles only. This signal is conducted to the holding relay 199 which is energized and de-energizes the levitation and partition field winding tuner and amplifier 165. The circuit to the thrust logic master switch amplifier and tuner 164 is also open as is the holding relay 197. These relays are all holding relays and will remain in a closed condition until the thrust logic master switch amplifier and tuner 164 is again activated. Thus current to the winding for each of the electromagnets of a grid segment are all simultaneously de-energized.

Figure 14:
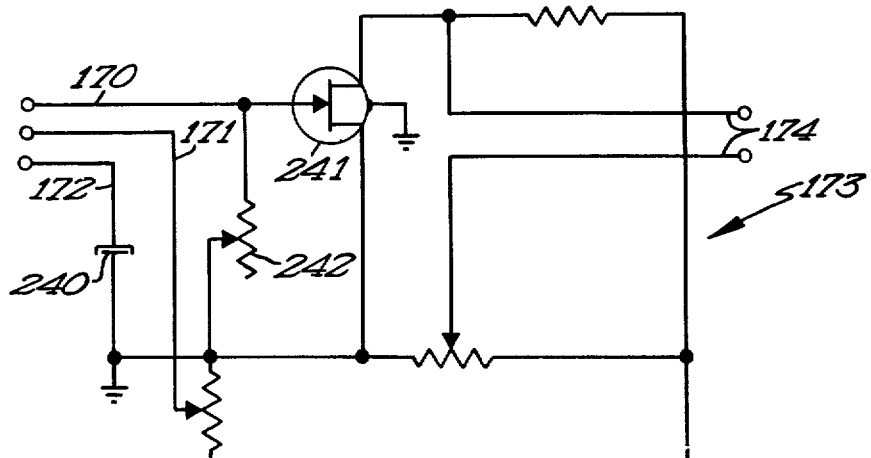

It is pointed out that as the vehicle passes forwardly along the roadway, the anticollision and lane spacing transducer 63 also transmits a signal from the vehicle and this signal is received by the inducers on each grid segment as the vehicle passes over each grid segment. The signal is transmitted to the braking leakdown amplifier and tuner 161. It is pointed out that the anticollision braking and lane spaq'ng transducer transmits a signal of 50 megacycles only and the amplifier and tuner 161 is tuned to receive this 50 megacycle signal only. When the braking leakdown amplifier and tuner 161 is energized, the relay 168 is energized and this energizes the braking timer 173. The braking timer is actually a leakdown circuit and in the embodiments shown is adapted to energize the reverse connections relay 175 which controls the latching relay circuits 185 and 188. In the embodiments shown, reverse connections relay 175 will actuate for a one-half second time period which produces a braking effect on any trailing vehicle which passes over the grid segment within this one-half second period. FIG. 14 is a detailed schematic of the braking timer, and it will be noted that when the conductors 171 and 172 are connected through relay 168 and relay switch 169 the braking timer circuit is in a charging cycle. When the braking timer circuit 173 is in the charging cycle, it is charging the time constant condenser 240. As the transducer 63 passes over or out of proximal relation with respect to a given grid segment, then the inducer on the grid segment will no longer receive a signal from the transducer 63 and the relay 168 will be actuated to interconnect conductors 171 and 172, and this would constitute the leakdown cycle for the braking timer circuit. The output signal will be directed to the reverse connections relay component 175 through the conductor 174.

Referring now to FIG. 3, it will be seen that a side elevational view is thereshown of the magnetic car 10 and a different magnetically impelled vehicle 10a. The vehicle 10a is adapted to traverse the magnetic roadway 11 and is provided with ground engaging wheels and a magnetic absorption shoe 226. The magnetic absorption shoe is provided with a plurality of UHF transducers which transmit signals to the roadway and rapidly alternates the thrust electromagnets of the grid segments. This alternation can be made as approximately 500 to 2000 cycles per second or more which is below the radio frequency spectrum and which induces A.C. current in a secondary coil located in the magnetic absorption shoe 226. The electrical current generated by this induction is used to operate an electrical motor which in turn is used to drive the front wheels of the vehicle 10a. Since the vehicle 10a is capable of operating on off-grid roadways, the induced current is also used to charge storage batteries for off-grid use.

Reference is now made to FIG. 2, which illustrates a conventional vehicle 10b which is provided with a magnetic shoe attachment 227. The magnetic shoe attachment 227 will be provided with thrust transducers which operate the thrust magnets of the grid segment and the circuitry associated therewith to thereby produce thrust of the vehicle 10b by the interacting magnetic fields produced by the grid segment and the magnets of segment magnetic attachments shoe 227. It is pointed out that suitable support means such as wheels for the magnetic attachment shoe 227 could be provided to prevent movement of the attachment shoe against the surface of the grid during coasting of the vehicle 10b. It is further pointed out that permanenet magnets could be substituted for the electromagnets on the car.

From the foregoing description, it will be seen that the present magnetic propulsion system provides a multilane grid surface which not only accommodates magnetic propulsion vehicles but also permits conventional vehicles to travel over the surface thereof. The interaction of the magnetic vehicles with the magnetic grid surface not only permits propulsion, but the present arrangement also permits a high degree of control by the operator of the magnetic vehicle while eliminating any danger of collision. The present magnetic propulsion system also eliminates pollution normally attributed to internal combustion engines, and since there is no interacting surfaces, the present system also avoids pollution problems which result from the wear of tires.

Thus it will be seen that I have provided a novel magnetic propulsion system which functions in a more efficient manner than any heretofore known comparable arrangement.

I claim:

1. A magnetic propulsion system comprising:
   a vehicle,
   a plurality of field-producing elements on said vehicle being operable when energized to produce magnetic fields,
   signal-producing means on the vehicle being operable to produce ultrahigh-frequency signals,
   means defining a roadway having a generally planar upper surface,
   a plurality of field-producing thrust and levitation elements on said roadway adjacent the upper surface thereof, a plurality of field-producing partition elements on said roadway adjacent the upper surface thereof, signal receiving means on the roadway adapted to receive ultrahigh frequency signals from the signal-producing means when the latter is in close proximity to the signal receiving means are thereby energized the field-producing elements on the roadway, the magnetic fields produced by the field-producing elements on the roadway interacting with the magnetic fields produced by the thrust and levitation field-producing elements on the vehicle to produce levitation of the vehicle above the surface of the roadway, and cause thrust of the vehicle longitudinally with respect to the roadway, said partition field-producing elements when energized, producing repelling fields whose profiles maintain the vehicle in a predetermined generally longitudinal path of travel.

2. The magnetic propulsion system as defined in claim 1 wherein said roadway has a width of sufficient magnitude to accommodate several vehicles in side-by-side relation.

3. The magnetic propulsion system as defined in claim 2 and means on said vehicle for de-energizing the field-producing partition elements on the roadway to permit said vehicle to move in a generally lateral direction.

4. The magnetic propulsion system as defined in claim 1 wherein said field-producing elements on said roadway includes a plurality of levitation field-producing elements, and a plurality of thrust field-producing elements, said levitation field-producing elements when energized, interacting with the field-producing elements on said vehicle to produce levitation of said vehicle, and said thrust field-producing elements on said roadway when energized interacting with the field-producing elements on said vehicle to produce forward thrust or stoppage of the vehicle.

5. The magnetic propulsion system as defined in claim 4 wherein said signal-producing means on said vehicle includes levitation transducer means and thrust transducer means, said levitation transducer means operable to transmit an ultrahigh-frequency signals of predetermined frequency to energize only certain levitation field-producing elements on the roadway which are disposed in close proximal relation to the vehicle, said thrust transducer means being operable to transmit ultrahigh-frequency signals of predetermined frequency energize only certain of the thrust field-producing elements on the roadway which are disposed in close proximal relation with respect to the vehicle.

6. A magnetic propulsion system as defined in claim 5 wherein said signal-producing means on the vehicle includes partition transducer means which is operable to transmit ultrahigh-frequency signals of predetermined frequency to only certain partitions field-producing elements on the roadway which are disposed in proximal relation with respect to the vehicle.

7. The magnetic propulsion system as defined in claim 6 and a control panel on the vehicle for selectively controlling said levitation transducer means, said thrust transducer means and said partition field transducer means on the vehicle.

8. A magnetic propulsion system comprising a vehicle, a plurality of field-producing elements on said vehicle being operable when energized to produce magnetic fields,
   a plurality of signal-producing mechanisms on the vehicle being operable to produce ultrahigh-frequency signals,
   means defining a roadway having a generally planar upper surface,
   a plurality of field-producing levitation elements arranged in generally longitudinally spaced relation on the roadway adjacent the upper surface thereof, and when energized producing magnetic fields whose polarity is opposite to the polarity of the producing elements on the vehicle to thereby elevate the vehicle above the surface of the roadway,
   a plurality of signal-receiving mechanism on the roadway adjacent the upper surface thereof, certain of said signal-receiving mechanisms receiving ultrahigh-frequency signals from certain of said signal-producing mechanisms to energize the field-producing levitation elements on the roadway,
   a plurality of thrust-producing field elements separate from said levitation field-producing elements on said roadway arranged in longitudinally spaced relation adjacent the upper surface thereof, and when energized producing a magnetic field, certain of said signal-receiving mechanisms receiving ultrahigh-frequency signals from said signal-producing mechanisms on the vehicle to energize the thrust-producing field elements on the roadway so that each thrust-producing field element produces alternating repelling and attracting fields with respect to the field-producing elements on the vehicle and thereby cause the vehicle to be thrust in a longitudinal direction, said signal-producing mechanisms on said vehicle including means adjacent the rear of the vehicle which produces a signal received by certain signal-receiving mechanisms to thereby cause each thrust-producing field element over which the rear end of the vehicle has passed to momentarily produce a magnetic field which serves to slow the forward movement of a trailing vehicle.

* * * * *